United States Patent
Taylor

(10) Patent No.: US 9,886,426 B1
(45) Date of Patent: Feb. 6, 2018

(54) METHODS AND APPARATUS FOR GENERATING AN EFFICIENT SVG FILE

(71) Applicant: ACCUSOFT CORPORATION, Tampa, FL (US)

(72) Inventor: Garland S Taylor, Valrico, FL (US)

(73) Assignee: ACCUSOFT CORPORATION, Tampa, FL (US)

( * ) Notice: Subject to any disclaimer, the term of this patent is extended or adjusted under 35 U.S.C. 154(b) by 84 days.

(21) Appl. No.: 14/670,128

(22) Filed: Mar. 26, 2015

(51) Int. Cl.
| | |
|---|---|
| *G06F 17/00* | (2006.01) |
| *G06F 17/22* | (2006.01) |
| *G06F 17/30* | (2006.01) |
| *G06F 17/21* | (2006.01) |
| *G06T 11/20* | (2006.01) |
| *G06T 11/60* | (2006.01) |
| *G06T 11/40* | (2006.01) |

(52) U.S. Cl.
CPC .... *G06F 17/2247* (2013.01); *G06F 17/30914* (2013.01); *G06F 17/211* (2013.01); *G06F 17/212* (2013.01); *G06F 17/214* (2013.01); *G06T 11/203* (2013.01); *G06T 11/40* (2013.01); *G06T 11/60* (2013.01)

(58) Field of Classification Search
CPC .. G06F 17/2247; G06F 17/211; G06F 17/212; G06F 17/214; G06T 11/203; G06T 11/30; G06T 11/40
USPC .................................................. 715/815, 838
See application file for complete search history.

(56) References Cited

U.S. PATENT DOCUMENTS

| | | | |
|---|---|---|---|
| 2010/0174732 A1* | 7/2010 | Levy ..................... | G06F 17/211 707/768 |
| 2012/0324341 A1* | 12/2012 | Dejean ................. | G06F 17/211 715/243 |
| 2015/0178248 A1* | 6/2015 | Hanninen .............. | G06T 11/60 715/234 |
| 2015/0193387 A1* | 7/2015 | Ho ........................ | G06F 17/214 715/269 |

OTHER PUBLICATIONS

Gottfried et al., ("Toward the Processing of Historic Documents" pp. 15-28 Published 2011.*

* cited by examiner

*Primary Examiner* — Quoc A Tran
(74) *Attorney, Agent, or Firm* — Straub & Straub; Michael P. Straub; Stephen T. Straub

(57) ABSTRACT

An input SVG file to be processed is accessed. Reusable symbols in the input SVG are identified, e.g., which satisfy a symbol size requirement. A set of symbols are selected from among the identified reusable symbols for conversion to glyphs of a custom binary font, e.g., based on symbol occurrence frequency. A binary font file is created corresponding to set the selected identified symbols in the SVG input file. An SVG output file is created including: binary font glyph definitions corresponding to the converted identified symbols, definitions of symbols from the SVG input file which have not been converted to glyphs and information indicating where the glyphs and symbols, which were not converted, are to be placed on an output display page. The generated SVG output file is a more efficient SVG file than the input SVG file. Different custom binary font files are created for different SVG input pages.

18 Claims, 7 Drawing Sheets

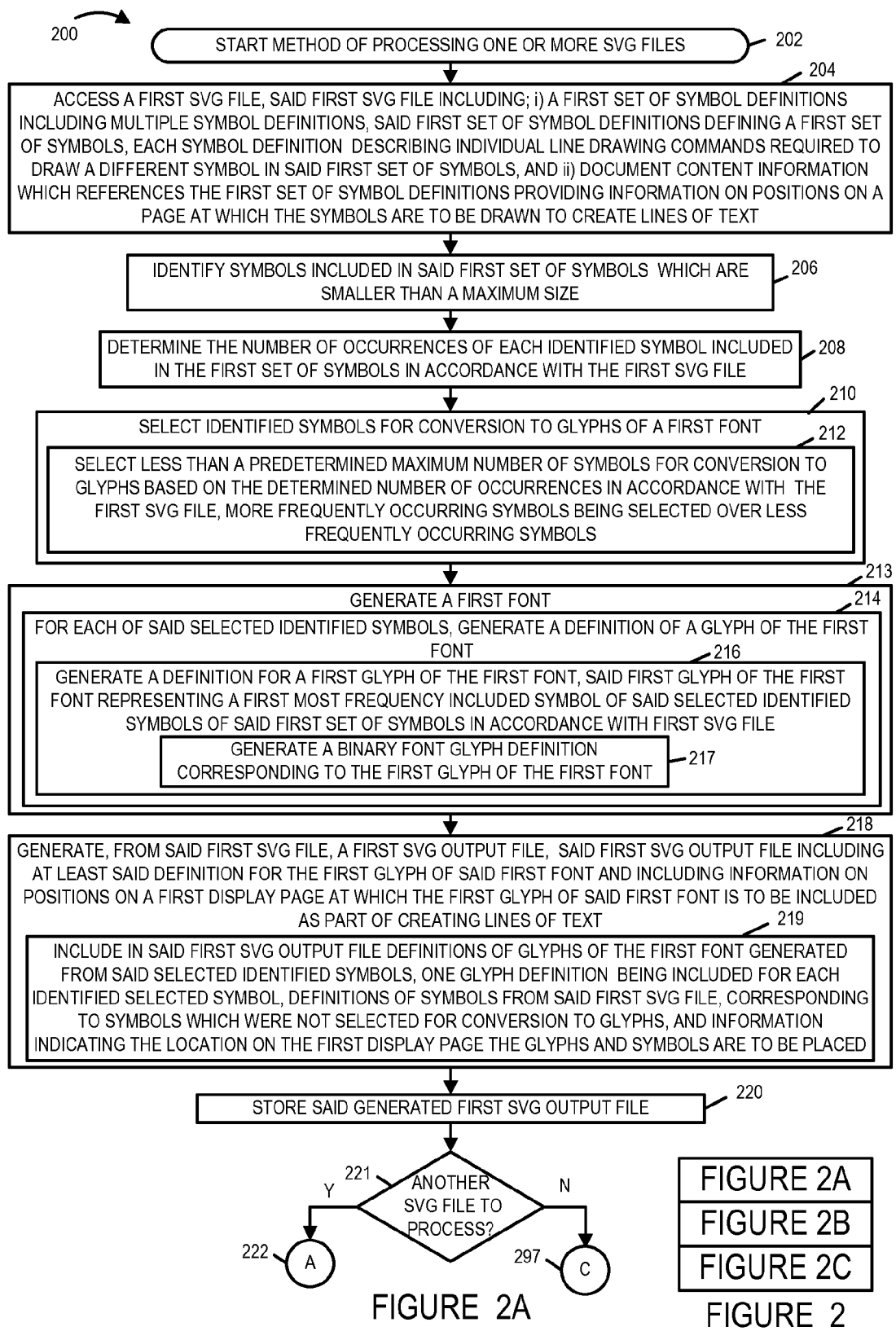

METHODS AND APPARATUS FOR GENERATING AN EFFICIENT SVG FILE

FIELD

The present application relates to document processing and, more particularly, to methods and apparatus for processing a Scalable Vector Graphics (SVG) input file, corresponding to a Portable Document Format (PDF) page, to generate an efficient, e.g., compact and easy to render, SVG output file.

BACKGROUND

PDF is a file format which is widely used for document including text as well as graphics. PDF files are not easily rendered in Web browsers which often do not support direct display of PDF file content. While the content of PDF files can be readily viewed using publically available viewers, such viewers are normally stand alone applications which need to be executed outside of a web browser making viewing of PDF documents using a Web browser a difficult experience. One reason for the failure of many browsers to directly support PDF documents is that the processing required to render such images makes for a somewhat unsatisfactory experience when PDF documents are to be retrieved and viewed on a mobile device in many cases.

Scalable Vector Graphics (SVG) is an Extensible Markup Language (XML)-based vector image format for two-dimensional graphics with supports interactivity and animation. The SVG specification is standard developed by the World Wide Web Consortium (W3C) with the expectation that it will be used for Web browsers and viewing of content via a Web browser.

Various open source publicly available utilities have been developed and are available for converting PDF documents to SVG documents. One such utility is pdftocairo. The utility pdftocairo converts PDF files into SVG markup that can be rendered by a browser. The SVG which pdftocairo creates includes two main parts: 1) a definition of symbols, each symbol definition describing the individual line drawing commands required to draw a particular symbol, e.g., letter, in a particular font, style, and size, and 2) the document content information which references these symbols to draw shapes which appear as lines of text on the page. Because pdftocairo relies on line drawings for generating SVG content, the SVG content is often larger in terms of file size than might be the case if text was recognized in the PDF file and then the text converted to a SVG file using text fonts.

While identifying text represented by a PDF file and then converting the text into an SVG file might seem like a practical approach it requires the knowledge of text content in the PDF file or the ability to reliably recognize text in the PDF file. While some PDF files include text information others represent the text using drawing information making it difficult to recognize.

In view of the above discussion, it should be appreciate that it would be desirable to be able to convert PDF documents including text in a reliable manner from the PDF format to an SVG format without the need to identify text in the PDF document but, at the same time avoid some of the disadvantages of the readily available conversion utilities which generate SVG files using primarily line drawings without the use of fonts which can result in a large file that can be difficult to render on a device due to the need to render the SVG files as drawings.

SUMMARY

Methods and apparatus for generating an efficient SVG output file from an input SVG file, which represents a page of a PDF file including text, are described.

An SVG file is accessed, e.g., retrieved from memory, which will be the input SVG file upon which processing in accordance with the present invention will occur. The accessed SVG file is, e.g., the result of a prior PDF file page conversion operation, e.g., using a conversion utility, to generate the SVG file without regard to the particular text content included in the PDF file. The SVG file created using the conversion utility represents the SVG file content using line drawing information in the form of symbols, rather than glyphs of one or more fonts. Thus, for the SVG file generated by the conversion utility, there is a set of symbol definitions which include line drawing information and information about where the symbols occur on a page.

To generate a more efficient SVG file, which remains SVG compliant, but is more compact and readily displayed by many devices with limited line drawing functionality, the input SVG input file, which was generated by the conversion utility, is processed. For the input SVG file symbols below a maximum size, e.g., a predetermined size which may be beneficial to represent as a font rather than a line drawing, are identified. The identified symbols are then reviewed to determine how frequently they occur, based on the information in the input SVG file being processed, and the identified symbols are ordered accordingly. A number of the most frequently occurring symbols are then identified and selected for conversion to glyphs of a font, e.g., glyphs of a binary font. In some embodiments the number of symbols which are identified for conversion to glyphs of font is limited to a predetermined number, i.e., 101 or lower. In such an embodiment, generated glyphs of the font correspond to identified and selected symbols, can, and in some embodiments are, readily be represented by the values commonly found an in an ASCII table.

The symbols identified and selected for conversion to glyphs of a font are converted and identified by corresponding numbers. A font file for the input SVG file which is being processed, including the definitions of the generated glyphs of the font, is included an output SVG file generated from the input SVG file. Definitions of symbols larger than the size which is considered for conversion to glyphs of a font and definitions of symbols which were not converted to glyphs of a font for another reason, e.g., because of their low occurrence rate or because the number of symbols exceeded the number which are allowed to be converted to glyphs of a font, are included in the output SVG file. Definitions of symbols which were converted to glyphs of a font for the SVG file being processed are not included in the output SVG file.

By generating glyphs of a font for at least some symbols, an output SVG file can be generated which in many cases will be more compact than the input SVG file which used simply symbols. During rendering the amount of line drawing the output device needs to perform will be reduced as compared to the case where the SVG file includes line drawing information corresponding to symbols and no drawing information for glyphs of a font.

In the above described manner, a relatively compact and easy to render SVG output file can be generated from an SVG input file, without the need to recognize or understand the actual text included in the PDF document page to which the SVG input file and SVG output file corresponds.

An exemplary method of processing one or more SVG files, in accordance with some embodiments, includes: accessing a first SVG file, said first SVG file including: i) a first set of symbol definitions including multiple symbol definitions, said first set of symbol definitions defining a first set of symbols, each symbol definition describing individual line drawing commands required to draw a different symbol in said first set of symbols, and ii) document content information which references the first set of symbol definitions providing information on positions on a page at which the symbols are to be drawn to create lines of text; generating a definition for a first glyph of a first font, said first glyph of the first font representing a first most frequently occurring symbol in said first set of symbols in accordance with said first SVG file; and generating, from said first SVG file, a first SVG output file, said first SVG output file including at least said definition for the first glyph of said first font and including information on positions on a first display page at which the first glyph of said first font is to be included as part of creating lines of text.

Numerous additional advantages, features and embodiments are discussed in the detailed description which follows.

BRIEF DESCRIPTION OF THE FIGURES

FIG. 2A is a first part of a flowchart of an exemplary method of processing one or more SVG files in accordance with an exemplary embodiment.

FIG. 2 comprises the combination of FIG. 2A, FIG. 2B and FIG. 2C.

DETAILED DESCRIPTION

Figure 1:
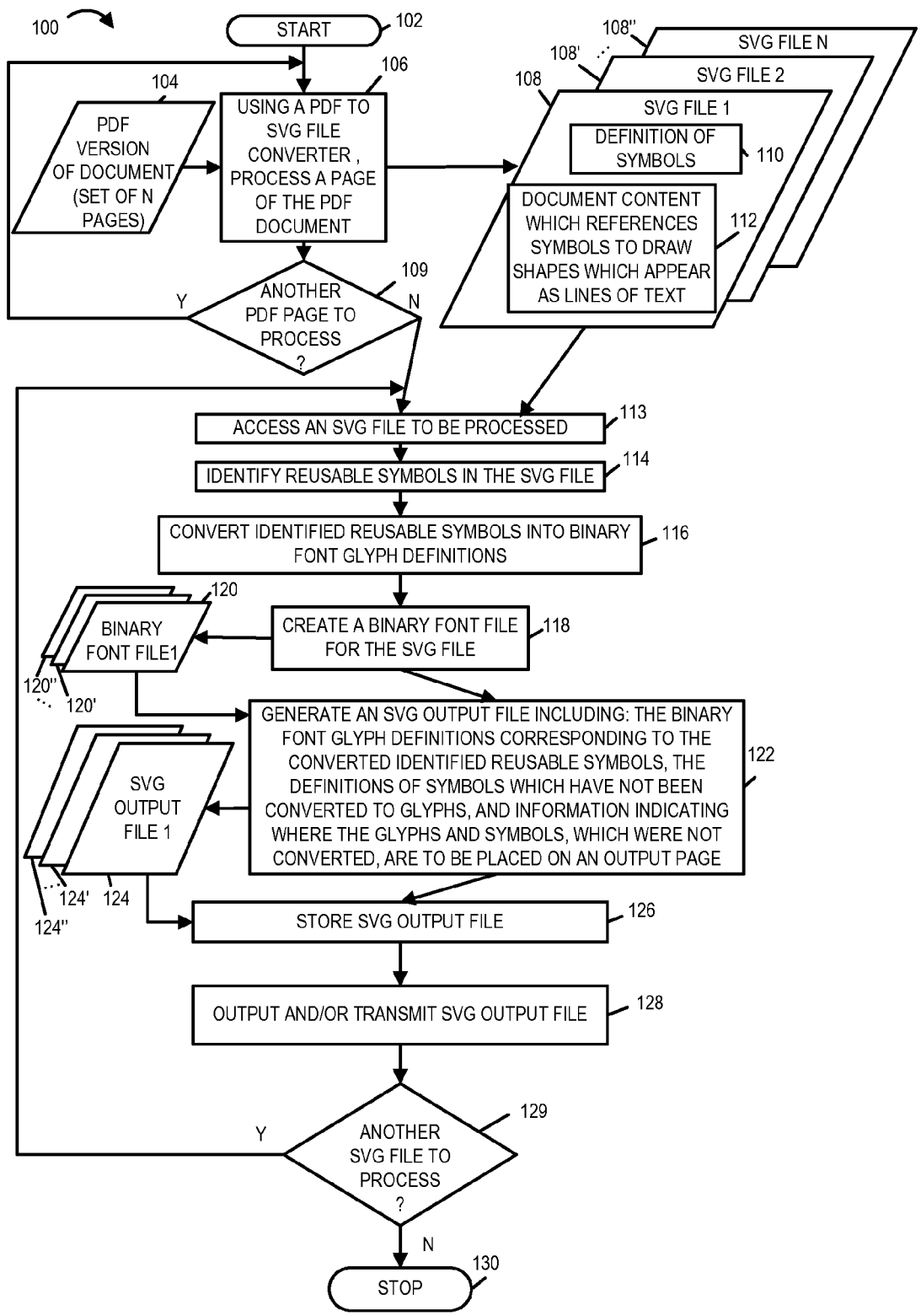
FIG. 1 illustrates the steps of an exemplary method of generating an SVG file in accordance with the present invention.

FIG. 1 is a flowchart 100 of an exemplary method of processing a PDF version of a document to generate efficient SVG compliant output files in accordance with an exemplary embodiment. Operation of the exemplary method starts in step 102 and proceeds to step 106. In step 106, a page of input PDF version document 104, is processed using a PDF to SVG file converter, e.g., the utility "pdftocairo", to generate an SVG file. For example, the first page of the N page PDF document 104 is processed to generate SVG file 1 108. In some embodiments, the PDF document 104 being processed is, e.g., a PDF file including multiple pages which was previously generated by a text to PDF conversion utility. Operation proceeds from step 106 to step 109, in which a determination is made as to whether there is another PDF page to process. If there is another PDF page to process, then operation proceeds from step 109 to step 106, in which the PDF to SVG file converter processes the next page to generate another SVG file. However, if there are not any additional PDF pages to process then operation proceeds from step 109 to step 113.

In this example, after the N iterations of step 106 are performed, there are N SVG stored files (SVG file 1 108, SVG file 2 108', . . . , SVG file N 108"), each SVG file (108, 108', . . . , 108"), corresponding to a different page of the PDF document 104.

In step 113, an SVG file to be processed is accessed, e.g., retrieved from memory. In the first iteration of step 113, SVG file 1 108 is accessed. SVG file 1 108 includes a definition of symbols 110 and document content 112 which references the symbols to draw shapes which appear as lines of text. Operation proceeds from step 113 to step 114, in which reusable symbols in the SVG file are identified. For example, the reusable symbols in the file which are identified in step 114 are a set of the M most frequently occurring symbols which are smaller than a maximum size. In one example, M is less than 102. Operation proceeds from step 114 to step 116.

In step 116 the identified reusable symbols are converted in binary font glyph definitions. Operation proceeds from step 116 to step 118 in which a binary font file is created for the SVG file being processed. For example, binary font file 1 120 is created for SVG file 1 108. Operation proceeds from step 118 to step 122, in which an SVG output file is generated, the SVG output file including the binary font glyph definitions corresponding to the converted identified reusable symbols, the definition of symbols which have not been converted to binary font glyphs, and information indicting where the glyphs and symbols, which were not converted, are to be placed on an output page. For example, SVG output file 1 124 is created in step 122 including information from SVG file 1 108 and information from binary font file 1 120. Operation proceeds from step 122 to step 124 in which the SVG output file is stored. Operation proceeds from step 126 to step 128 in which the SVG output file is output and/or transmitted. Operation proceeds from step 128 to step 129.

In step 129 it is determined whether or not there is another SVG file to process. If there are not any more SVG files to process, then operation proceeds from step 129, to stop step 130. However, if there are more SVG files to be processed, then operation proceeds from step 129 to step 113, in which another SVG file is accessed, e.g., the next SVG file in the ordered set of SVG files (108, 108, . . . , 108"). Processing of SVG file 2 108' results in binary font file 2 120' and SVG output file 2 124'. Processing of SVG file N 108" results in binary font file N 120" and SVG output file N 124".

In general each SVG file (108, 108', . . . , 108") being processed has a different generated binary font file (120, 120', . . . , 120"), as the identified set of reusable symbols in the each SVG file (108, 108', . . . , 108") which are designated to be converted to glyphs of a font, may be different or may be ordered differently.

In another exemplary embodiment, the PDF to SVG file converter converts a single page of the input PDF document to an SVG file, and then the SVG file is processed to create a corresponding SVG output file, and the processes repeats until the entire set of pages of the input PDF document have been processed.

Figure 2B:
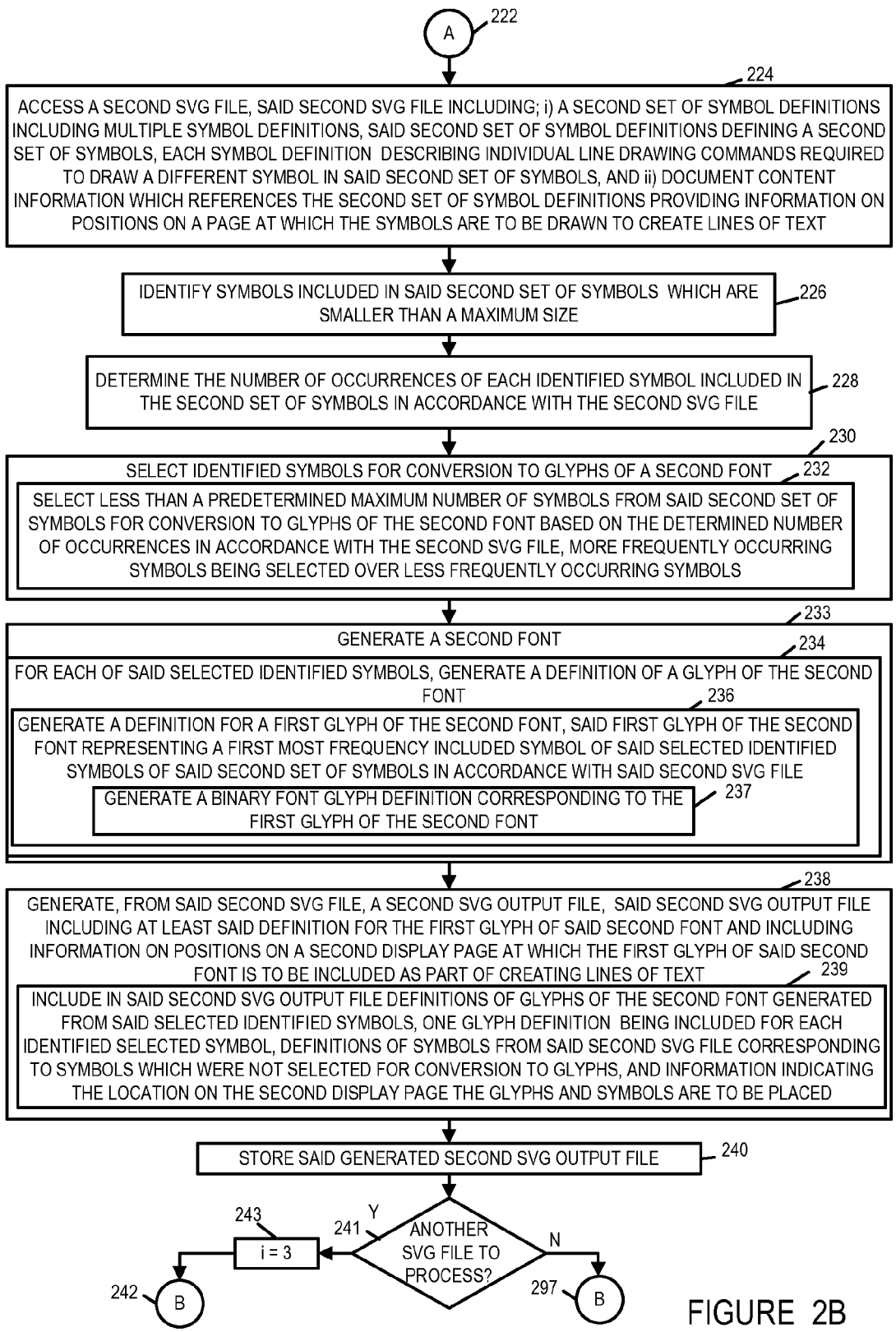
FIG. 2B is a second part of a flowchart of an exemplary method of processing one or more SVG files in accordance with an exemplary embodiment.
Figure 2C:
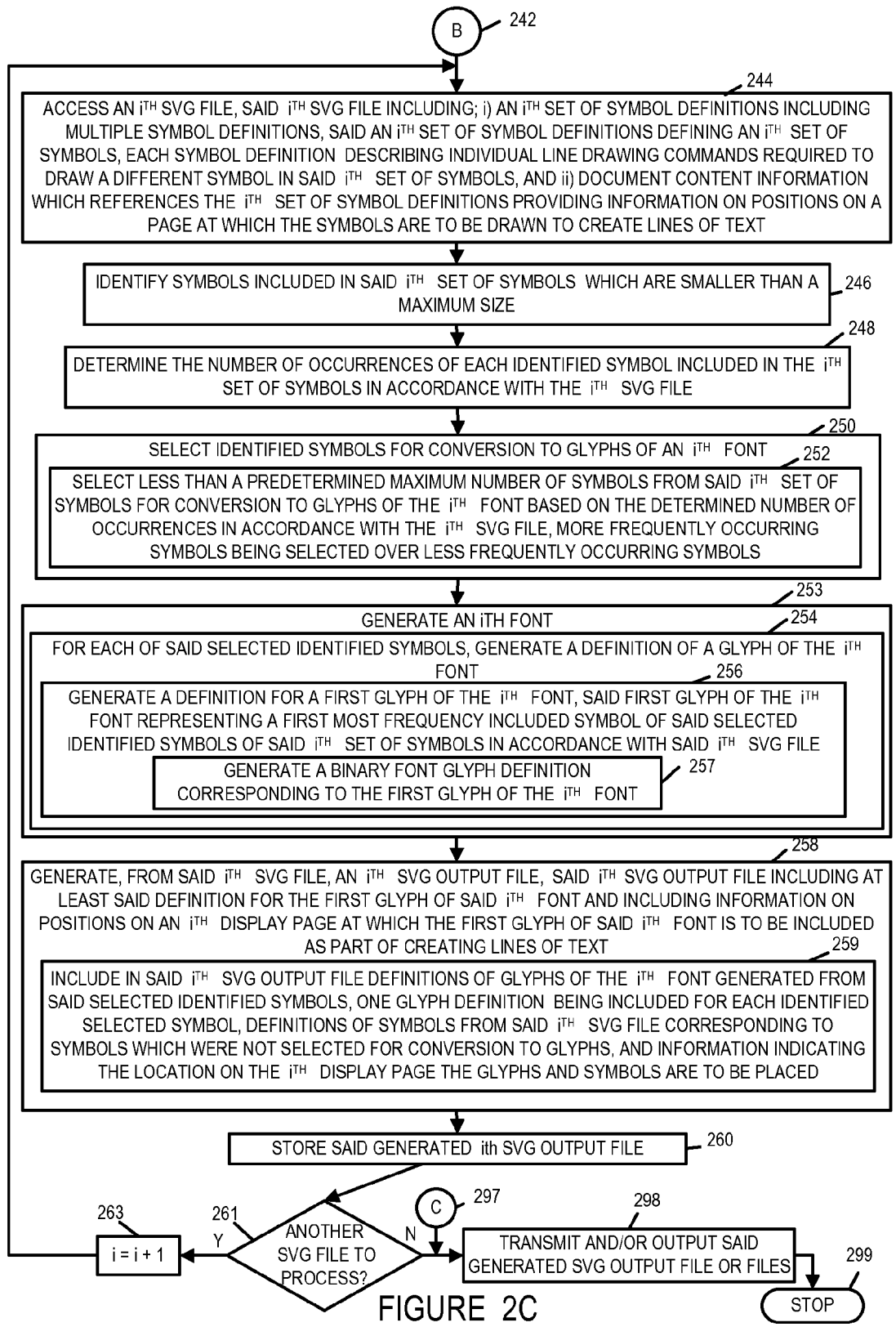
FIG. 2C is a third part of a flowchart of an exemplary method of processing one or more SVG files in accordance with an exemplary embodiment.

FIG. 2, comprising the combination of FIG. 2A, FIG. 2B and FIG. 2C, is a flowchart 200 of an exemplary method of processing one or more SVG files in accordance with an exemplary embodiment. Operation starts in step 202, in which the processing device implementing the method of flowchart 200 is powered on and initialized. Operation proceeds from step 202 to step 204.

In step 204 the processing device accesses, e.g., retrieves from memory for processing, a first SVG file, said first SVG file including: i) a first set of symbol definitions including multiple symbol definitions, said first set of symbol definitions defining a first set of symbols, each symbol definition describing individual line drawing commands required to draw a different symbol in said first set of symbols, and ii) document content information which references the first set of symbols definitions providing information on positions on a page at which the symbols are to be drawn to create lines of text. In some embodiments, the first SVG file includes a single page of content, and the first SVG file was generated by converting a first page of content of a PDF file into said first SVG file. In some embodiments, each symbol in the first set of symbols corresponds to a text element, e.g., a letter, number, punctuation mark, etc., having a particular font, e.g., Times New Roman, Arial, etc., having a particular style, e.g., regular, italics, bold, etc., and having a particular size, e.g., 8 pt., 10 pt, 12 pt, etc. In some embodiments, different symbols in said first set of symbols correspond to text elements of different fonts. In some embodiments, different symbols in the first set of symbols correspond to text elements having different styles.

Operation proceeds from step 204 to step 206. In step 206 the processing device identifies symbols included in said first set of symbols which are smaller than a maximum size. The identified symbols are potential candidates for conversion to glyphs of a first font. Operation proceeds from step 206 to step 208.

In step 208 the processing device determines the number of occurrences of each identified symbol included in the first set of symbols in accordance with the first SVG file. Operation proceeds from step 208 to step 210.

In step 210 the processing device selects identified symbols for conversion to glyphs of a first font. Step 210 includes step 212, in which the processing device selects less than a predetermined maximum number of symbols for conversion to glyphs of a first font based on the determined number of occurrences in accordance with the first SVG file, more frequently occurring symbols being selected over less frequently occurring symbols. In some embodiments, the number of identified symbols selected for conversion to glyphs of the first font is less than 102.

In some embodiments, the processing device estimates an SVG file size reduction benefit from selecting a particular identified symbol for conversion to a glyph of the first font. In some embodiments, the processing device estimates an image rendering benefit from selecting a particular identified symbol for conversion to a glyph of the first font. In some embodiments, the processing device performs the selection of step 210 based on at least two of: the number of occurrences, estimated file size reduction information, and estimated rendering benefit information.

Operation proceeds from step 210 to step 213. In step 213 the processing device generates a first font, which is a first custom font. Step 213 includes step 214. In step 214 the processing device generates a definition of a glyph of the first font for each of the selected identified symbols. Step 214 includes step 216 in which the processing device generates a definition for a first glyph of the first font, said first glyph of the first font representing a first most frequently included symbol of said selected identified symbols of said first set of symbols in accordance with first SVG file.

Step 216 includes step 217 in which the processing device generates a binary font glyph definition corresponding to the first glyph of the first font.

In some embodiments, glyphs of the first font are identified by assigned values in an ASCII table. In various embodiments, the first font does not include advance width information. In various embodiments, the first font does not include kerning information.

Operation proceeds from step 213 to step 218. In step 218 the processing device generates from said first SVG file, a first SVG output file, said first SVG output file including: at least said definition of said first glyph of said first font and including information on positions on a first display page at which the first glyph of said first font is to be included as part of creating lines of text. Step 218 includes step 219 in which the processing device includes in first SVG output file definitions of glyphs of the first font generated from said identified selected symbols, one glyph definition being included for each identified selected symbol, definitions of symbols from said first SVG file, corresponding to symbols which were not selected for conversion to glyphs of the first font, and information indicating the location on the first display page the glyphs and symbols are to be placed, e.g., are to be drawn. Operation proceeds from step 218 to step 220, in which the processing device stores said generated first SVG output file. Operation proceeds from step 220 to step 221.

In step 221 the processing device determines whether or not there is another SVG file to be processed. If there is not another SVG file to be processed, then operation proceeds from step 221, via connecting node C 297 to step 298. However, if there is another SVG file to be processed, then operation proceeds from step 221 to step 224, via connecting node A 222.

In step 224 the processing device accesses, e.g., retrieves from memory for processing, a second SVG file, said second SVG file including: i) a second set of symbol definitions including multiple symbol definitions, said second set of symbol definitions defining a second set of symbols, each symbol definition describing individual line drawing commands required to draw a different symbol in said second set of symbols, and ii) document content information which references the second set of symbols definitions providing information on positions on a page at which the symbols are to be drawn to create lines of text. Operation proceeds from step 224 to step 226. In some embodiments, the second SVG file includes a single page of content, and the second SVG file was generated by converting a second page of content of the PDF file into said second SVG file.

In step 226 the processing device identifies symbols included in said second set of symbols which are smaller than a maximum size. The identified symbols are potential candidates for conversion to glyphs of a second font. Operation proceeds from step 226 to step 228.

In step 228 the processing device determines the number of occurrences of each identified symbol included in the second set of symbols in accordance with the second SVG file. Operation proceeds from step 228 to step 230.

In step 230 the processing device selects identified symbols for conversion to glyphs of a second font. Step 230 includes step 232, in which the processing device selects less than a predetermined maximum number of symbols from said second set of symbols for conversion to glyphs of the second font based on the determined number of occurrences in accordance with the second SVG file, more frequently occurring symbols being selected over less frequently occurring symbols. Operation proceeds from step 230 to step 233.

In step 233 the processing device generates a second font, which is a second custom font. Step 233 includes step 234. In step 234 the processing device generates a definition of a glyph of the second font for each of the selected identified symbols which were selected for conversion to glyphs of the second font. Step 234 includes step 236 in which the processing device generates a definition for a first glyph of the second font, said first glyph of the second font representing a first most frequently included symbol of said selected identified symbols of said second set of symbols in accordance with second SVG file. Step 236 includes step 237 in which the processing device generates a binary font glyph definition corresponding to the first glyph of the second font.

In various embodiments, the second font is different from the first font. There may be different symbols in the first SVG file that are candidates for conversion to glyphs of the first font as compared to the symbols in the second SVG file that are candidates for conversion to glyphs of the second font, e.g., as a function of the content of the text, e.g., a different set of letters may be used on the first and second pages and/or based on symbol size information. The symbols selected to generate the first font may be different than the selected symbols used to generate the second font, e.g., based on which symbol frequency of occurrence information. The number of glyphs in the second font may be different than the number of glyphs in the first font, e.g. one of the first and second SVG files may include at least 101 symbols which are candidates for conversion and the other one of the first and second SVG files may include less than 101 symbols which are candidates for conversion. The same symbol may appear in both the first and second SVG files, and may be selected to be converted to a glyph in the first font and a glyph in the second font, but may be assigned different identifier values, e.g., different mapping values, in the ASCII table, based on different symbol frequency occurrence information.

Operation proceeds from step 233 to step 238. In step 238 the processing device generates from said second SVG file, a second SVG output file, said second SVG output file including: at least said definition of said first glyph of said second font and including information on positions on a second display page at which the first glyph of said second font is to be included as part of creating lines of text. Step 238 includes step 239 in which the processing device includes in the second SVG output file definitions of glyphs of the second font generated from said identified selected symbols, one glyph definition being included for each identified selected symbol, definitions of symbols from said second SVG file, corresponding to symbols which were not selected for conversion to glyphs of the second font, and information indicating the location on the second display page the glyphs and symbols are to be placed, e.g., are to be drawn. In various embodiments, the first SVG output file does not include definitions of symbols which were converted to glyphs. Operation proceeds from step 238 to step 240, in which the processing device stores said generated second SVG output file. Operation proceeds from step 240 to step 241.

In step 241 the processing device determines whether or not there is another SVG file to be processed. If there is not another SVG file to be processed, then operation proceeds from step 241, via connecting node C 297, to step 298. However, if there is another SVG file to be processed, then, operation proceeds from step 241 to step 243, in which the value of i is set to 3. Operation proceeds from step 243 to step 244, via connecting node B 242.

In step 244 the processing device accesses, e.g., retrieves from memory for processing, an $i^{th}$ SVG file, said $i^{th}$ SVG file including: i) an $i^{th}$ set of symbol definitions including multiple symbol definitions, said $i^{th}$ set of symbol definitions defining an $i^{th}$ set of symbols, each symbol definition describing individual line drawing commands required to draw a different symbol in said $i^{th}$ set of symbols, and ii) document content information which references the $i^{th}$ set of symbols definitions providing information on positions on a page at which the symbols are to be drawn to create lines of text. In the first iteration of step 244, i=3. In some embodiments, the ith SVG file includes a single page of content, and the ith SVG file was generated by converting a ith page of content of the PDF file into said ith SVG file. Operation proceeds from step 244 to step 246.

In step 246 the processing device identifies symbols included in said $i^{th}$ set of symbols which are smaller than a maximum size. The identified symbols are potential candidates for conversion to glyphs of an $i^{th}$ font. Operation proceeds from step 246 to step 248.

In step 248 the processing device determines the number of occurrences of each identified symbol included in the $i^{th}$ set of symbols in accordance with the $i^{th}$ SVG file. Operation proceeds from step 248 to step 250.

In step 250 the processing device selects identified symbols for conversion to glyphs of a $i^{th}$ font. Step 250 includes step 252, in which the processing device selects less than a predetermined maximum number of symbols for conversion to glyphs based on the determined number of occurrences in accordance with the $i^{th}$ SVG file, more frequently occurring symbols being selected over less frequently occurring symbols. Operation proceeds from step 250 to step 253.

In step 253 the processing device generates an $i^{th}$ font, which is an $i^{th}$ custom font. Step 253 includes step 254. In step 254 the processing device generates a definition of a glyph of the $i^{th}$ font for each of the selected identified symbols which were selected for conversion to glyphs of the $i^{th}$ font. Step 254 includes step 256 in which the processing device generates a definition for a first glyph of the $i^{th}$ font, said first glyph of the $i^{th}$ font representing a first most frequently included symbol of said selected identified symbols of said $i^{th}$ set of symbols in accordance with $i^{th}$ SVG file. Step 256 includes step 257 in which the processing device generates a binary font glyph definition corresponding to the first glyph of the $i^{th}$ font.

Operation proceeds from step 254 to step 258. In step 258 the processing device generates from said ith SVG file, an $i^{th}$ SVG output file, said $i^{th}$ SVG output file including: at least said definition of said first glyph of said $i^{th}$ font and including information on positions on a $i^{th}$ display page at which the first glyph of said $i^{th}$ font is to be included as part of creating lines of text. Step 258 includes step 259 in which the processing device includes in the ith SVG output file definitions of glyphs of the ith font generated from said identified selected symbols, one glyph definition being included for each identified selected symbol, definitions of symbols from said $i^{th}$ SVG file, corresponding to symbols which were not selected for conversion to glyphs of the $i^{th}$ font, and information indicating the location on the $i^{th}$ display page the glyphs and symbols are to be placed, e.g., are to be drawn. Operation proceeds from step 258 to step 260, in which the processing device stores said generated ith SVG output file. Operation proceeds from step 260 to step 261.

In step 261 the processing device determines whether or not there is another SVG file to be processed. If there is another SVG file to be processed, then, operation proceeds from step 261 to step 263 in which the value of i is incremented by one, and operation proceeds from step 263 to step 244, via connecting node B 242.

Returning to step 261, if there is not another SVG file to be processed, then operation proceeds from step 261 to step 298 in which the processing device transmits and/or outputs the generated SVG output file or files. In some embodiments, the SVG output files are transmitted via a network interface, e.g., a wired or fiber optic interface, and/or via a wireless interface. In accordance with a feature of the present invention, an SVG output file is smaller in size, e.g., more compact, than an SVG input file, which was processed in accordance with the method of the present invention. In some embodiments, the SVG output files are output using a display included in the processing device, e.g., an SVG output file is sent to a SVG file rendering module included in a Web browser to execute the instructions in the SVG output file and draw a page of text which is displayed. In various embodiments, the rendering, using the SVG output file including the generated binary font information, is more efficient, e.g., faster and/or uses less memory, than would be the case if the rendering was performed using the input SVG file. Operation proceeds from step 298 to stop step 299.

Figure 3:
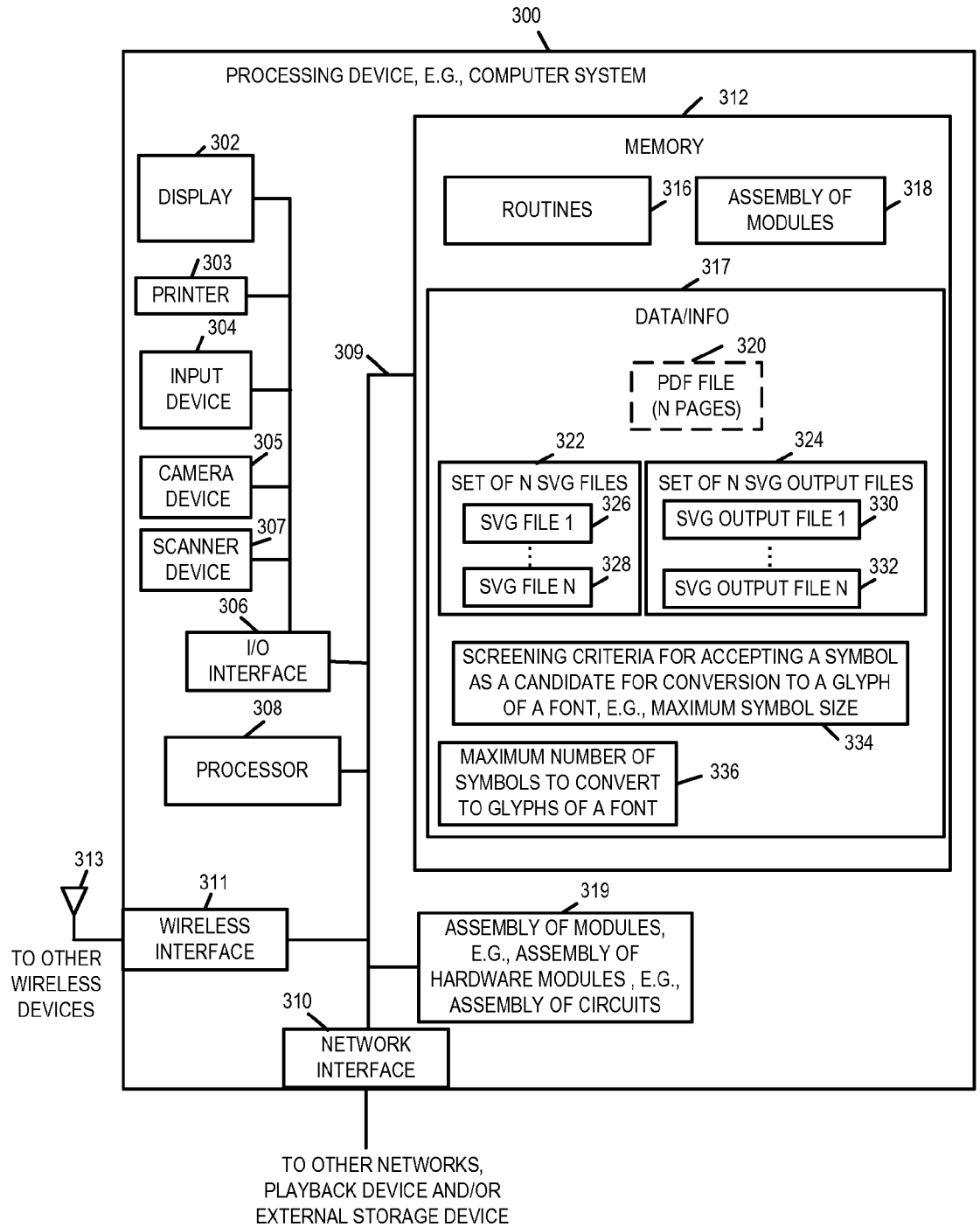
FIG. 3 is a drawing of an exemplary processing device in accordance with an exemplary embodiment.

FIG. 3 illustrates an exemplary processing device 300, e.g., a computer system, implemented in accordance with the present invention, to process input SVG files and generate SVG output files, e.g., more efficient SVG output files. In some embodiments, processing device 300 is a portable device, e.g., a handheld device including wireless communications capability. The processing device 300 includes various modules for performing the steps of methods of the present invention, e.g., such as the methods of flowchart 100 of FIG. 1, and/or of flowchart 200 of FIG. 2.

As shown in FIG. 3, the processing device 300 includes a display 302, a printer 303, an input device 304, a camera device 305, a scanner device 307, an input/output interface 306, a processor 308, e.g., a CPU, a network interface 310, a wireless interface 311, and a memory 312. The input/output interface 306 is coupled to the display 302, printer 303, input device 304, camera device 305, and scanner device 307, and the input/output device 306 couples those devices (302, 303, 305, 307) to other elements in processing device 300, via bus 309. The input/output interface 306, processor 308, network interface 310, wireless interface 311, and memory 312 are coupled together by a bus 309 over which the various elements may exchange data and information. The display 302 can be used to display a pdf file, a SVG input file, an SVG output file, or a rendered output page generated by a Web browser from an input or output SVG file. The user can input control parameters using the input device 304 which may be, e.g., a keyboard or other input device. The camera device 305 may capture an image, e.g., an image of a page of text from which a pdf file may be obtained. The scanner device 307 may scan a page to obtain an image from which a pdf file may be obtained. The network interface 310 includes transmitters and receivers for transmitting and receiving data and information. The wireless interface 311 includes transmitters and receivers for transmitting and receiving information, and the wireless interface 311 is coupled to antenna 313, via which data and information, may be communicated to other devices which include wireless capability. In some embodiments a PDF version of a document, input SVG files to be processed and/or output SVG files are communicated over one or both of network interface 910 and wireless interface 311. The processor 308 performs various operations in accordance with the invention, e.g., under direction of routines 316 and/or one or more of the modules stored in the assembly of modules 318. In some embodiments, the each of the modules in the assembly of modules is included in with routines 316. Routines 316 includes, e.g., main routines and subroutines. While the assembly of modules 318 includes various software modules, the modules may and in some embodiments are, implemented in hardware. In some embodiments, some modules in the assembly of modules are implemented in hardware and other modules in the assembly of modules are implemented in software. In some embodiments processing device 300 includes assembly of modules 319, e.g., an assembly of hardware modules, e.g. circuits, coupled to bus 309.

The memory 312 further includes data/information 317. Data information 317 includes a set of N SVG input files (SVG file 1 326, . . . , SVG file N 328), a set of N SVG output files (SVG output file 1 330, . . . , SVG output file N 332), screening criteria for accepting a symbol as a candidate for conversion to a glyph of a font 334, e.g., a maximum symbol size, and a maximum number of symbols to convert to glyphs of a font 336 for a SVG file. In some embodiments, data/information 317 further includes a PDF file 320 including N pages. In some embodiments, the set 322 of N SVG input files have been received via wireless interface 311 and/or network interface 310. In other embodiments, the set 322 of N SVG input files have been generated by processing device 300 from PDF file 320, e.g., using a PDF to SVG utility, e.g., the utility pdftocairo. In one exemplary embodiment, the maximum symbol size for a SVG symbol to be considered as a candidate for conversion to a glyph of a font is 30 by 30 user units. In some embodiments, the maximum number of symbols to convert to glyphs of a font for an SVG file being processed is 101.

Figure 4:
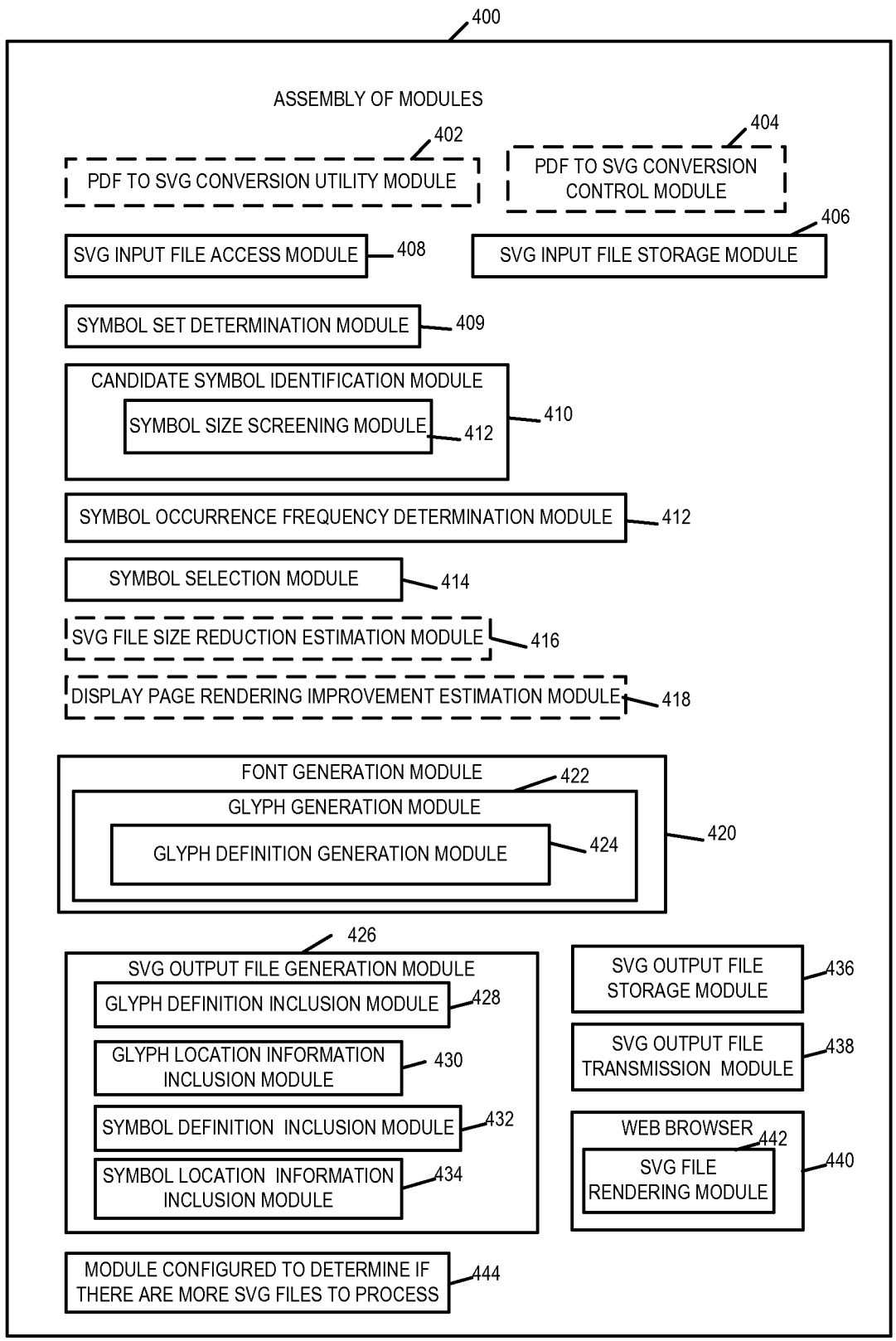
FIG. 4 is a drawing of an exemplary assembly of modules which may be included in the processing device of FIG. 4 in accordance with an exemplary embodiment.

FIG. 4 illustrates an exemplary assembly of modules 400 which can, and in some embodiments is, used in the processing device 300 illustrated in FIG. 3, e.g., as assembly of modules 318. Assembly of modules 400 can be implemented in hardware within the processor 308 of the processing device 300, e.g., as individual circuits. The modules in the assembly 400 can, and in some embodiments are, implemented fully in hardware within the processor 308, e.g., as individual circuits. In other embodiments some of the modules are implemented, e.g., as circuits, within the processor 308 with other modules being implemented, e.g., as circuits, e.g., in assembly of modules 319, external to and coupled to the processor. As should be appreciated the level of integration of modules on the processor and/or with some modules being external to the processor may be one of design choice.

Alternatively, rather than being implemented as circuits, all or some of the modules 400 may be implemented in software and stored in the memory 312 of the device 300 with the modules controlling operation of device 300 to implement the functions corresponding to the modules when the modules are executed by a processor, e.g., processor 308. In some such embodiments, the assembly of modules 400 is included in the memory 312. In still other embodiments, various modules are implemented as a combination of hardware and software, e.g., with another circuit external to the processor providing input to the processor 308 which then under software control operates to perform a portion of a module's function. While shown in the FIG. 3 embodiment as a single processor, e.g., computer, it should be appreciated that the processor 308 may be implemented as one or more processors, e.g., computers.

When implemented in software the modules include code, which when executed by the processor 308, configure the processor 308 to implement the function corresponding to the module. In embodiments where the assembly of modules 400 is stored in the memory 312, the memory 312 is a computer program product comprising a computer readable medium comprising code, e.g., individual code for each module, for causing at least one computer, e.g., processor 308, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 3 control and/or configure the processing device 300 or elements therein such as the processor 308, to perform the functions of the corresponding steps illustrated in the method flowchart 100 of FIG. 1, and/or the method of flowchart 200 of FIG. 2. Thus the assembly of modules 400 includes various modules that perform functions of the corresponding steps of the method shown in FIG. 1 and/or FIG. 2.

Assembly of modules 400 includes an SVG input file storage module 406, an SVG input file access module 408, a symbol set determination module 409, a candidate symbol identification module 410, a symbol occurrence frequency determination module 412, a symbol selection module 414, a font generation module 420, and a SVG output file generation module 426. Candidate symbol identification module 410 includes symbol size screening module 412. Front generation module 422 includes glyph generation module 422 which includes glyph definition generation module 424.

SVG output file generation module 426 includes a glyph definition inclusion module 428, a glyph location information inclusion module 430, a symbol definition inclusion module 432, and a symbol location information inclusion module 434.

Assembly of modules 400 further includes an SVG output file storage module 436, an SVG output file transmission module 438, a web browser 440 including a SVG file rendering module 442, and a module 442 configured to determine if there are more SVG input files to process and control operation as a function of the determination.

In some embodiments, assembly of modules includes a PDF to SVG conversion utility module 402, e.g., pdftocairo utility, and a PDF to SVG conversion control module 404 configured to control the PDF to SVG conversion module 402 to operate and process a page of an input PDF file to generate a corresponding SVG file. Control module 404 is configured to control the conversion utility module 402 to process each page of the PDF file to generate a set of SVG files. In some embodiments, SVG input file storage module 406 is configured to store SVG files which are output from the PDF to SVG conversion, e.g., in set of N SVG files 332. In some embodiments, SVG input file storage module 406 is configured to store SVG files which were received over wireless interface 311 or network interface 310, e.g., in set of N SVG files 332.

SVG input file access module 408 is configured to access, e.g., retrieve for processing, an SVG file. For example SVG input file access module is configured to access a file in set of N SVG files.

Symbol set determination module 409 is configured to determine a set of symbols that are included in the SVG file which was accessed by module 408, e.g., identify a set of symbols in the SVG files and symbol size information corresponding to the symbols.

Candidate symbol identification module 410 is configured to identify symbols in the determined set of symbols included in the accessed SVG file which are acceptable candidates for conversions to glyphs of a font, e.g., glyphs of a custom binary font, based on predetermined select/reject criteria. Symbol size screening module 412 tests each symbol in the set of symbols of the accessed SVG page to determine whether the size of the symbol being tested is smaller than a maximum size considered suitable for conversion. In one example, the screening criteria 334 is used to decide whether or not to accept a symbol as a candidate for conversion.

Symbol occurrence frequency determination module 412 counts the number of times the same SVG symbol reoccurs in accordance with the information included in the accessed SVG file being processed for each of the symbols which have been identified as potential candidates for conversion by module 410.

Symbol selection module 414 selects a set of symbols from the identified potential candidates to be converted to glyphs of a font. In various embodiments, the selection of module 414 is based on the occurrence information from module 412, with more frequently occurring symbols being selected over less frequently occurring symbols.

In some embodiments, assembly of modules 400 includes one or both of a SVG file size reduction estimation module 416 and a display page rendering improvement estimation module 418. SVG file size reduction module 416 estimates a SVG file size reduction, from the SVG input file being processed to SVG output file, which will be achieved if a particular candidate symbol is converted to a glyph of the font, e.g., for each of the potential candidate symbols which may be selected for conversion. In some embodiments, the symbol selection module 414 selects symbols for conversion as a function of the file SVG reduction estimation information output from module 416, e.g., selecting a set of symbols to be converted which results in the most compact SVG output file. Display page rendering improvement estimation module 418 estimates a rendering improvement, e.g. in terms of rendering speed and/or amount of memory needed, if a candidate symbol is replaced by a glyph of a font in the SVG file being processed, e.g., for each of the candidate symbols. In some embodiments, the symbol selection module 414 selects symbols for conversion as a function of the display page rendering estimation information output from module 418, e.g., selecting a set of symbols to be converted which results in the most rendering improvement.

In some embodiments, symbol occurrence information, SVG file size reduction estimation information, and rendering improvement information is used by symbol selection module 414 to select the set of symbols to be converted to glyphs of a font from the candidate symbols identified by module 410.

In some embodiments, symbol selection module 414 is configured to select less than a predetermined maximum number of symbols for conversion. In one example, symbol selection module 414 is configured to select less than 102 symbols for conversion; there the maximum number of symbols which can be selected for conversion is 101.

Font generation module 420 generates a custom font for the accessed SVG file being processed, e.g., a binary font including glyphs corresponds to each of symbols selected for conversion. In one exemplary embodiment, each of the glyphs of the font are identified by assigned values in an ASCII table. In some embodiments, font generation module 420 generates a binary font file.

Glyph generation module 422 generates, for each selected symbol being converted, a glyph of the font. Glyph definition generation module 424 generates a definition for the glyph, e.g., including instruction to draw the binary font glyph.

SVG output file generation module 426 generates an SVG output file corresponding to the SVG input file being processed, the SVG output file includes one or more glyphs of a font, which have replaced selected symbols of the input SVG file. Glyph definition inclusion module 428 includes, in the SVG output file, the glyph definitions of the generated font, which were generated by font generation module 420. Glyph location information inclusion module 430 includes, in the SVG output file, information indicating the location on an output page on which the glyphs of the generated font are to be placed. Symbol definition inclusion module 432 includes, in the SVG output file, the symbol definitions corresponding to symbols which were not selected for conversion to glyphs of the font. Symbol location information inclusion module 432 includes, in the SVG output file, information indicating the location on an output page on which the symbols, which were not selected for conversion to the font, are to be placed. Modules 432 and 432 copy selected information from the accessed SVG input file being processed.

SVG output file storage module 436 stores a generated SVG output file from module 426 in memory, e.g. in set of N SVG output files 324. SVG output file transmission module 438 transmits a generated SVG output file to another device, e.g., via network interface 310 or wireless interface 311.

SVG file rendering module 442 is configured to render an output display page, corresponding to the SVG output file, e.g., on display 502, in accordance with the information included in the SVG output file.

In one embodiment, processing device 300 includes assembly of modules 400 of FIG. 4 and implements the method of flowchart 100 of FIG. 1. PDF to SVG conversion utility module 402 is configured to implement step 106; PDF to SVG conversion control module is configured to implement step 108. SVG input file storage module 406 is configured to store the SVG files output from step 106 as SVG files (108, 108', ... 108'). SVG input file access module 408 is configured to implement step 113. In some embodiments, step 114 is performed by the combined operation of modules 409, which identifies the set of symbols used in the accessed SVG page being processed, modules 410 and 412 which produce a set of candidate symbols for conversions, modules 412, optionally module 416 and optionally module 418, which generate evaluation data used in the selection process and symbol selection module 414 which selects the set of symbols to be converted to glyphs of the font, e.g., based on the evaluation data. Font generation module 420, including modules 422 and 424, is configured to implement step 116. SVG output file generation module 426 including modules (428, 430, 432, and 432) is configured to implement step 122. SVG output storage module 436 is configured to implement step 128. SVG file rendering module 442 and/or SVG output transmission module 438 is configured to implement step 128. Module 444 is configured to implement step 129.

In another embodiment, processing device 300 includes assembly of modules 400 of FIG. 4 and implements the method of flowchart 200 of FIG. 2. SVG input file access module 408 is configured to implement steps 204, 224 and 244. Symbol size screening module 412 is configured to implement step 206, 226 and 246. Symbol occurrence frequency determination module 412 is configured to implement step 208, 228 and 248. Symbol selection module 414 is configured to implement step 210 including step 212, step 230 including step 232, and step 250 including step 252. Font generation module 420 including module 422 and module 424 is configured to implement step 213 including step 214 including steps 216 including step 217, step 233 including step 234 including step 236 including step 237, and step 253 step 254 including step 256 including step 257. SVG output file generation module 426 including modules (428, 430, 432, 434) is configured to implement step 218 including step 219, step 238 including step 229 and step 258 including step 249. Module 444 is configured to implement steps 221, 241 and 261. Module 436 is configured to implement steps 220, 240 and 260. SVG file rendering module 442 is configured to implement step 298 when the SVG output files are to be used to render an image displayed on display device 302 or printed via printer 303. SVG output file transmission module 438 is configured to implement step 298 when the SVG output files are to be transmitted via network interface 310 or wireless interface 311.

Various aspects and/or features of the invention are further discussed below. Methods and apparatus for generating efficient output SVG files, that include binary font information, are compact and relatively easy to render, from input SVG files, that rely primarily on symbol and line drawing information, are described. In some embodiments, the PDF file page, from which the input SVG file, was previously generated may have been, and in some embodiments was, previously generated from a text to pdf conversion of a text document, e.g., a Word file. In some embodiments, the PDF file page, from which the input SVG file, was previously generated may have been, and in some embodiments was, previously generated from a scanned version of a paper document.

A PDF file page may have been subjected to processing by a PDF to SVG file converter that created the SVG input file that includes two main parts: 1) a definition of symbols, each symbol describing the individual line drawing commands required to draw the particular symbol, e.g., letter, in a particular font, style, and size, and 2) the document content which references these symbols to draw shapes which appear as lines of text on the page.

The SVG input file is then processed in accordance with the invention to convert one or more symbols in the SVG input file into glyphs of a custom font which are included in a small binary font file. In one such embodiment each glyph in the font file corresponds to one of a plurality of original symbols included in the SVG input file. The SVG input file is then subject to further processing to create an output SVG file, e.g., a new optimized SVG file, representing the original document contents. This is done in one particular exemplary embodiment by replacing a series of symbol references with a series of glyph references of the generated custom font.

In this manner, the generated output SVG file can, in many cases, be made to be smaller than the input SVG file allowing for a shorter download time than if the input SVG file were delivered over the Internet. The smaller output SVG file size also takes less memory than the input SVG file size and can be rendered faster than the originally generated input SVG file.

The methods and apparatus of the invention allow for existing open source file converters such as, e.g., the pdf-tocairo utility, to be used to generate an SVG file from a PDF file, but overcome the disadvantages of using such a utility by producing, after additional processing in accordance with the resent invention, a more compact and more easily rendered output SVG file, than the SVG file which was initially produced by the open source file PDF to SVG file converter. The output SVG file, which is transmitted and/or used to render a display image, is still a SVG compliant version of the original PDF document. Thus the output SVG file is an improved version, e.g., more efficient version, of the input SVG file. Accordingly, the benefits of compact and efficient representation of data is achieved while still taking advantage of the processing already available by at least some open source utilities.

In various embodiments, in accordance with the present invention, an input SVG file is improved, e.g., optimized, to generate an output SVG file including a dynamically generated built-in font. Some HTML viewer products, e.g., some HTML5 viewer products, rely upon an open source utility program, e.g., pdftocairo, to convert PDF files into SVG markup that can be rendered by a browser. The SVG which pdftocairo produces is highly accurate, but it does not take advantage of SVG's built-in support for rendering text. Instead, pdftocairo creates SVG that includes two main parts: 1) a definition of symbols, each symbol describing the individual line drawing commands required to draw a particular symbol in a particular font, style, and size, and 2) the document content which references these symbols to draw shapes which appear as lines of text on the page. Because pdftocairo does not use SVG's built-in support for drawing text with fonts, the resulting SVG is larger than it needs to be, takes longer to download than it should require, takes more memory when loaded in the browser than it should, and takes longer for the browser to render to the screen than it should.

An exemplary method, in accordance with the present invention, identifies reusable symbols in an SVG file, convert at least some of these symbols into a small custom binary font file, where each character in the font corresponds to one of the original symbols in the SVG file, and then optimize the SVG file by replacing a series of symbol references with a simple text drawing command using our custom font and the appropriate set of characters.

In some embodiments, the exemplary method only considers a symbol in a SVG file being processed as a candidate for replacement if its overall size is not larger than 30 by 30 user units. In practical terms, this usually means that any text in the source document which is larger than about 30 point size will not be replaced. As such, the method essentially focuses on optimizing body text and ignoring large headings.

Figure 5:
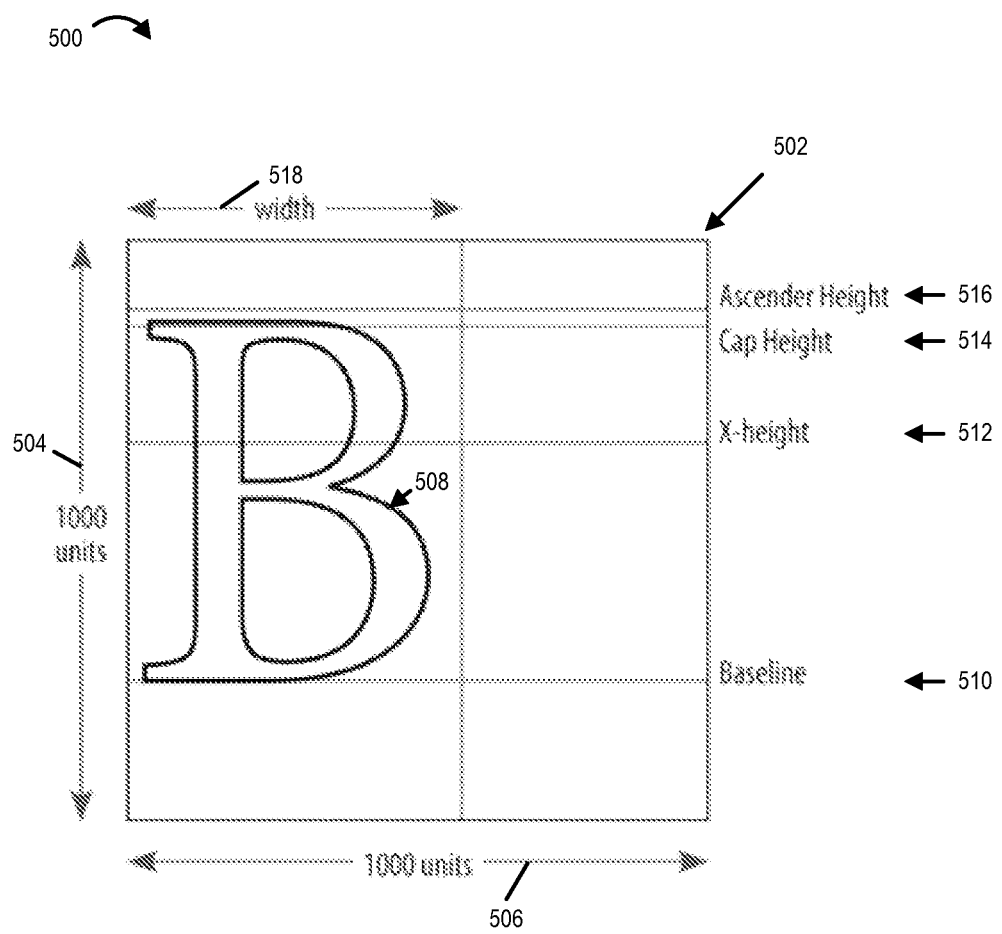
FIG. 5 is a drawing of an exemplary em square including an exemplary glyph.

The reason this SVG symbol size restriction is incorporated is because there are limits to how large one can define a glyph within a font. In a font, the glyphs define how each letter is to be drawn. FIG. 5 is a drawing 500 of an exemplary em square 502 including an exemplary glyph 508. The em square has a height 504 of 1000 units×a width 506 of 1000 units. Exemplary width 518, baseline height 510, X-height 512, cap height 514 and ascender height 516 are also shown in FIG. 5.

Each glyph typically fits within a standard-size square known as the em square. Within a normal conventional font, each of the letters should fit comfortably within the em square. On occasion some fancy conventional fonts with flourishes may have glyphs which go beyond the boundaries of the em square, e.g., imagine a fancy g or y in a calligraphy font, and this is allowed, but generally speaking each of the glyphs of the conventional font look about the same size and fit within the font's em square. The actual size of a glyph in a conventional font is controlled later when the font is applied at various point sizes.

However, in accordance with various embodiments of the present invention, the font size is not varied at all. This is in contrast to the approach typically used with a conventional font. The processing device does not actually know the point size used to produce the various symbols in the SVG file being processed; there is a collection of symbols of varying size and point size information is not known. Some symbols in the SVG file being processed may be very large (perhaps they represent a letter at 48 point). Some symbols in the SVG file being processed may be very small (say representing a letter at 6 point). Instead of trying to resize all of the symbols to fit within the font's em square, the symbol path definition, for selected symbols which are to be converted, is moved into the custom font being generated, without dynamically resizing it to fit in the em square. Symbols which represent letters at 6 point will be very small within the em square, symbols representing letters at 12 point will fit just right, and symbols representing 24 point will be larger than the font's em square, etc.

In accordance with some conventions, there are supposed to be limits to how far beyond a font's em square a glyph is defined. If your path goes spills too far beyond the edges of the em square, you may reach a point where the letter is no longer drawn in its entirety. For this reason, in some embodiments of the present invention, symbols are rejected as candidates for conversion to a glyph of the custom font being generated for the SVG file being processed, which are determined to be larger than about 30 points in size. In some other embodiments of the present invention, the size restriction used for accepting a symbol as a candidate for conversion is less restrictive. In some such embodiments, In the exemplary image 500 of FIG. 5, our font's em square 502 is 1000×1000 units. This corresponds to a 12×12 unit space where the SVG symbol is defined. In various embodiments, in accordance with the present invention, a constant scaling factor is applied when moving symbols from the SVG file being processed into the custom font being generated for the SVG page. Thus, scaling is performed because the SVG and font coordinate systems are different; however, scaling is not performed to make the symbol "fit" the em square.

In accordance with a feature of various embodiments of the present invention, a SVG output file, generated in accordance with a method of the present invention, is different than typical normal SVG file, in that the text in the SVG output file is unreadable when viewing the source code.

In typical SVG, a line of text would be represented like so: <text>The quick brown fox jumps over the lazy dog.</text> This would render that line of text on the screen using whatever font was currently active. With a typical normal SVG file, the text in the source code is typically just as readable as the text on the screen.

In accordance with various embodiments of the present invention, the method creates text which is readable on screen, e.g., when rendering of the SVG output file occurs, but source code which is unreadable. For the same sentence above, source code included in the generated SVG output file may look like the following:
<text x="72.02 79.45 86.05 96.1 102.72 109.43 112.1 118.1 127.43 134.14 138.13 144.8 153.34 163.28 166.75 173.46 182.68 185.34 192.05 202.12 208.82 218.06 224.77 230.65 237.36 244.7 248.03 254.75 264.8 267.46 274.16 280.04 289.26 295.99 302.7 309.3" y="83.040">:%!B+*5;6."/ $7"CD+38,"E!.#%!0)?4("−1</text>

There are two things happening here:
1. The actually characters used to render the different paths are not 'T' 'h' 'e' 'q' 'u' 'i' 'c' 'k' etc., but ':' '%' '!' 'B' '+' '*' '5' ';' etc.
2. There are no spaces in our text. Instead, letter spacing is specified exactly using individual x coordinates for each letter.

The primary reason the output looks this way is that a custom font is being built based on the data available in the SVG file being processed, which is an output from a utility, e.g., pdftocairo, and there is font information that is not known to the processing device. Specifically, there are two things that are not known by the processing device: 1) what character a symbol actually represents and 2) how much space should be put between letters. Each item will be described in a little more detail below.

The processing device does not know what character a symbol represents. It is known that there are different symbols which represent different letters, but it is not known what the letters actually are. That is, it is not known that the first symbol is really a letter 'T', the next symbol an 'h', an 'e', an "q", and so on. However, it is known where those symbols need to be drawn. In this example, the first symbol has been assigned to the ':' character in our font, the next symbol to the '%' character, then the '!' character, then the 'B' character, and so on.

In accordance with a feature of various embodiments of the present invention, symbols in the SVG file being processed which meet the acceptance criteria to be converted to glyphs of the custom font being generated, are put into the custom font being generated based on the order of how frequently the symbol is used on the page, and each symbol being converted is assigned to one of the characters in an ordered constant list of ASCII character slots in the font. Thus each symbol being converted to a glyph of the custom font is identified by an assigned value in an ASCII table. This means that the processing device starts assigning symbols to some punctuation characters (!"#$%( )*+,-./), then number characters (0123456789), then some more punctuation (:;=?@), then capital letters (ABCDEFHI-JKLMNOPQRSTUVWXYZ), and so on through the ASCII table, limiting ourselves to a specific range that is known to render consistently across various operating systems and browsers.

In one exemplary embodiment, the number of symbols which can be converted to glyphs of a custom font for an SVG file being processed is limited to being able to replace 101 characters on a page. There are some pages where, if this restriction was not in place, it would be possible to optimize the SVG file even further. In other embodiment, in accordance with the implementation, e.g., using Unicode characters instead of ASCII characters, the exemplary method allows for the replacement of thousands of characters on a page, effectively removing this limit of 101.

In the example above, if spaces are put into our "garbled" text, which previously included no spacing, and additional spacing is added both between the words of the original text and the characters of the "garbled text" for clarity, the mapping of symbols to our chosen characters can be seen, as shown below.

| The | quick | brown | fox | jumps | over | the | lazy | dog. |
|---|---|---|---|---|---|---|---|---|
| :%! | B+*5; | 6."/$ | 7"C | D+38, | "E!. | #%! | 0)?4 | ("-1 |

Notice that there are exactly the same number of non-space characters in both lines.

A normal conventional font defines a lot of information about how to draw two letters next to each other. First, it defines how wide each letter is by default (each glyph's advance width). Then, it also defines how this width should be adjusted for various pairs of letters (called kerning). For example, putting A and V next to one another looks strange unless the V is moved back closer to the A, so most normal conventional fonts will contain a kerning rule for the pair "AV".

In various embodiments of the present invention, the processing device, which is reviewing SVG symbols of the SVG input file being processed, e.g., the pdftocairo SVG symbols, does not know either the advance width or the font kerning. Thus, the custom font, which is generated in accordance with the present invention, lacks much of the basic spacing data which makes a typical conventional font useful. Fortunately, because of the way the PDF format works, the SVG input file being processed, e.g., the pdftocairo SVG file, explicitly specifies the exact x and y position where every symbol should be drawn on the page so that we can render the page content correctly.

Therefore, in various embodiments implemented in accordance with the present invention, the space character is not used in the generated SVG output file which is generated. Thus, the text in the SVG output file has no space characters, and the x coordinate of each letter in the SVG output file is explicitly specified, as shown below.
<text x="72.02 79.45 86.05 96.1 102.72 109.43 112.1 118.1 127.43 134.14 138.13 144.8 153.34 163.28 166.75 173.46 182.68 185.34 192.05 202.12 208.82 218.06 224.77 230.65 237.36 244.7 248.03 254.75 264.8 267.46 274.16 280.04 289.26 295.99 302.7 309.3" y="83.040">:%!B+*5;6."/$7"CD+38,"E!.#%!0)?4("-1</text>

Various embodiments, in accordance with the present invention have Digital Rights Management (DRM)-related advantages over other approaches.

Text, corresponding to converted SVG symbols, is unreadable to the casual browser of source code in the SVG output file generated in accordance with the present invention. To read the text easily, one can view the SVG in an actual web browser which executes the source code and produces an viewable output page.

A custom font, generated in accordance with the present invention for a specific SVG file being processed and included in the generated SVG output file, is not immediately useful in general, for other purposes.
1. You cannot type with the custom font because the character mappings are wrong.
2. The advance width is not properly defined for glyphs.
3. There is no kerning information defined at all.
4. The custom font includes information for producing representations of selected symbols, e.g., letters, punctuations marks, etc., which are used to draw a single page. If a particular letter did not happen to used on the text page for which the custom font was generated, that letter will not be included in the custom font generated for that particular page. Thus a custom font in accordance with the present invention may, and sometimes does correspond to a portion of an alphabet rather than a complete alphabet.
5. Because each of the selected symbols on a page are put into a single custom font, the various glyphs in the custom font may appear to come from multiple font families.

6. The glyphs in the custom font may vary a lot in their size, and their size may be much smaller than the font's em square. In some embodiments, the glyphs in the custom font may vary a lot in size, and their size may be much smaller or much larger than the font's em square.

In other words, various embodiments, in accordance with the present invention, deliberately ignore many of the rules and expectations that people have for a font and instead simply takes advantage of the font format as a vehicle to compactly define the symbols we want to draw for a particular page. A custom font, generated in accordance with the present invention, is useful to a computer program, implementing a method in accordance with the present invention, to render that page to the screen; however, the custom font, in accordance with the present invention, would not be considered a useful or real font, in the conventional sense, by a designer.

The techniques of various embodiments may be implemented using software, hardware and/or a combination of software and hardware. Various embodiments are directed to apparatus, e.g., an processing device or system. Various embodiments are also directed to methods, e.g., a method of processing one or more SVG files, e.g., corresponding to PDF pages of a text document, to generate more efficient SVG files. Various embodiments are also directed to machine, e.g., computer, readable medium, e.g., ROM, RAM, CDs, hard discs, etc., which include machine readable instructions for controlling a machine to implement one or more steps of a method.

In various embodiments apparatus described herein are implemented using one or more modules to perform the steps corresponding to one or more methods. Thus, in some embodiments various features are implemented using modules. Such modules may be implemented using software, hardware or a combination of software and hardware. In some embodiments in which the modules are implemented in hardware, the modules are implemented as circuits, e.g., of a processor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing device or system. In some embodiments the processing device is a portable device including a camera, e.g., a cell phone including a camera with a processor that implements the method.

In some embodiments modules are implemented using software, in other embodiments modules are implemented in hardware, in still other embodiments the modules are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A method of processing one or more SVG files to generate glyph definitions on a per page basis, the method comprising:

accessing a first SVG file corresponding to a first page, said first SVG file including: i) a first set of symbol definitions including multiple symbol definitions, said first set of symbol definitions defining a first set of symbols, each symbol definition describing individual line drawing commands required to draw a different symbol in said first set of symbols, and ii) document content information which references the first set of symbol definitions providing information on positions on the first page where symbols are located as part of lines of text;

identifying different symbols which occur on said first page;

selecting some of the different identified symbols for conversion to glyphs based on the number of occurrences of individual identified symbols on the first page, a more frequently occurring identified symbol being selected over a less frequently occurring identified symbol, said selected identified symbols including at least a first most frequently occurring identified symbol on said first page;

generating a definition for a first glyph of a first font, said first glyph of the first font representing the first most frequently occurring identified symbol on the first page; and generating, from said first SVG file, a first SVG output file, said first SVG output file including at least said definition for the first glyph of said first font and including information on positions on the first page at which the first glyph is located as part of lines of text.

2. The method of claim 1, wherein each symbol in said first set of symbols corresponds to a text element having a particular font particular style, and particular size.

3. The method of claim 2, wherein different sets of letters may be used on the first and second pages.

4. The method of claim 1, further comprising:

accessing a second SVG file corresponding to a second page, said second SVG file including: i) a second set of symbol definitions including multiple symbol definitions, said second set of symbol definitions defining a second set of symbols, each symbol definition in the second set of symbol definitions describing individual line drawing commands required to draw a different symbol in said second set of symbols, and ii) document content information which references the second set of symbol definitions providing information on positions on the second page where symbols are located as part of lines of text;

identifying different symbols which occur on said second page;

selecting some of the different identified symbols on the second page for conversion to glyphs based on the number of occurrences of individual identified symbols on the second page, a more frequently occurring identified symbol on the second page being selected over a less frequently identified symbol on the second page, said selected identified symbols of the second page including at least a first most frequently occurring identified symbol on said second page;

generating a second definition for a second glyph of a second font, said second glyph of the second font representing the first most frequently occurring identified symbol of the second page; and generating, from said second SVG file, a second SVG output file, said second SVG output file including at least said second definition for the second glyph of said second font and including information on positions on the second page at which the second glyph is located as part of lines of text.

5. The method of claim 1, wherein different symbols in said first set of symbols corresponds to text elements having different sizes.

6. The method of claim 1, wherein generating a definition for a first glyph of a first font includes generating a binary font glyph definition corresponding to the first glyph.

7. The method of claim 6, wherein said first font does not include advance width information.

8. The method of claim 7, wherein said first font does not include kerning information.

9. The method of claim 1, wherein selecting some of the different identified symbols for conversion to glyphs based on the number of occurrences individual identified symbols on the first page includes selecting less than a predetermined maximum number of symbols for conversion to glyphs.

10. The method of claim 9, wherein the glyphs of the first font are identified by assigned values in an ASCII table.

11. The method of claim 9, wherein the number of identified symbols selected for conversion to glyphs for the first font is less than 102.

12. The method of claim 9, wherein generating, from said first SVG file, a first SVG output file includes:

including in said first SVG output file definitions of glyphs generated from said selected identified symbols, one glyph definition being included for each identified selected symbol, definitions of symbols from said first SVG file, corresponding to symbols which were not selected for conversion to glyphs; and information indicating the location on the first display page the glyphs and symbols are to be placed.

13. The method of claim 12, wherein the first SVG output file does not include definitions of symbols which were converted to glyphs.

14. The method of claim 13, wherein said second font is different from said first font.

15. The method of claim 14,
wherein said first SVG file includes a single page of content;
wherein said first SVG file was generated by converting a first page of content of a PDF file into said first SVG file; and
wherein said second SVG file includes a single page of content generated by converting a second page of content of said PDF file into said second SVG file.

16. A non-transitory computer readable medium including processor executable instruction which when executed by a processor control said processor to:

access a first SVG file, said first SVG file including: i) a first set of symbol definitions including multiple symbol definitions, said first set of symbol definitions defining a first set of symbols, each symbol definition describing individual line drawing commands required to draw a different symbol in said first set of symbols, and ii) document content information which references the first set of symbol definitions providing information on positions on a page at which the symbols are to be drawn to create lines of text;

generate a definition for a first glyph of a first font, said first glyph of the first font representing a first most frequently occurring symbol in said first set of symbols in accordance with said first SVG file; and generate, from said first SVG file, a first SVG output file, said first SVG output file including at least said definition for the first glyph of said first font and including information on positions on a first display page at which the first glyph of said first font is located as part of creating lines of text.

17. An apparatus for performing processing of an SVG file, the apparatus comprising:
a memory including a first SVG file; and
a processor configured to:
access a first SVG file corresponding to a first page, said first SVG file including: i) a first set of symbol definitions including multiple symbol definitions, said first set of symbol definitions defining a first set of symbols, each symbol definition describing individual line drawing commands required to draw a different symbol in said first set of symbols, and ii) document content information which references the first set of symbol definitions providing information on positions on the first page where symbols are located as part of lines of text;
identify different symbols which occur on said first page;
select some of the different identified symbols for conversion to glyphs based on the number of occurrences of individual identified symbols on the first page, a more frequently occurring identified symbol being selected over a less frequently occurring identified symbol, said selected identified symbols including at least a first most frequently occurring identified symbol on said first page;
generate a definition for a first glyph of a first font, said first glyph of the first font representing the first most frequently occurring identified symbol on the first page; and
generate, from said first SVG file, a first SVG output file, said first SVG output file including at least said definition for the first glyph of said first font and including information on positions on the first page at which the first glyph is located as part of lines of text.

18. A system for processing one or more SVG files, the system comprising:
a processor configured to:
access a first SVG file corresponding to a first page, said first SVG file including: i) a first set of symbol definitions including multiple symbol definitions, said first set of symbol definitions defining a first set of symbols, each symbol definition describing individual line drawing commands required to draw a different symbol in said first set of symbols, and ii) document content information which references the first set of symbol definitions providing information on positions on the first page where symbols are located as part of lines of text;
identify different symbols which occur on said first page;
select some of the different identified symbols for conversion to glyphs based on the number of occurrences of individual identified symbols on the first page, a more frequently occurring identified symbol being selected over a less frequently occurring identified symbol, said selected identified symbols including at least a first most frequently occurring identified symbol on said first page;

generate a definition for a first glyph of a first font, said first glyph of the first font representing the first most frequently occurring identified symbol on the first page; and generate, from said first SVG file, a first SVG output file, said first SVG output file including at least said definition for the first glyph of said first font and including information on positions on the first page at which the first glyph is located as part of lines of text.

* * * * *